US008919199B2

(12) United States Patent
Judy et al.

(10) Patent No.: US 8,919,199 B2
(45) Date of Patent: Dec. 30, 2014

(54) APPARATUS AND METHOD FOR ANCHORING ELECTRODES IN MEMS DEVICES

(75) Inventors: Michael W. Judy, Ipswich, MA (US); John A. Geen, Tewksbury, MA (US); Houri Johari-Galle, Sunnyvale, CA (US)

(73) Assignee: Analog Devices, Inc., Norwood, MA (US)

( * ) Notice: Subject to any disclaimer, the term of this patent is extended or adjusted under 35 U.S.C. 154(b) by 232 days.

(21) Appl. No.: 13/308,687

(22) Filed: Dec. 1, 2011

(65) Prior Publication Data

US 2012/0137773 A1 Jun. 7, 2012

Related U.S. Application Data

(60) Provisional application No. 61/418,668, filed on Dec. 1, 2010.

(51) Int. Cl.
| | | |
|---|---|---|
| *G01C 19/56* | (2012.01) | |
| *G01P 15/125* | (2006.01) | |
| *G01C 19/5698* | (2012.01) | |
| *G01C 19/5684* | (2012.01) | |

(52) U.S. Cl.
CPC ........ *G01C 19/5698* (2013.01); *G01C 19/5684* (2013.01)
USPC .................. 73/504.12; 73/504.13; 73/514.32

(58) Field of Classification Search
USPC ............... 73/504.12, 504.13, 504.04, 514.32, 73/514.36, 524.38
See application file for complete search history.

(56) References Cited

U.S. PATENT DOCUMENTS

| | | | |
|---|---|---|---|
| 4,655,081 A | 4/1987 | Burdess | 73/505 |
| 4,809,589 A | 3/1989 | Bertrand | 92/98 R |
| 5,177,579 A | 1/1993 | Jerman | 73/724 |
| 5,383,362 A | 1/1995 | Putty et al. | 73/505 |
| 5,450,751 A | 9/1995 | Putty et al. | 73/504.18 |
| 5,589,082 A | 12/1996 | Lin et al. | 216/2 |
| 5,616,864 A | 4/1997 | Johnson et al. | 73/504.04 |
| 5,750,899 A | 5/1998 | Hegner et al. | 73/756 |
| 5,767,405 A | 6/1998 | Bernstein et al. | 73/504.16 |
| 5,783,749 A | 7/1998 | Lee et al. | 73/504.12 |

(Continued)

FOREIGN PATENT DOCUMENTS

| | | | |
|---|---|---|---|
| EP | 0860685 | 8/1998 | G01C 19/56 |
| EP | 1788385 | 5/2007 | G01N 29/02 |

(Continued)

OTHER PUBLICATIONS

Ayazi, "Intergrated Solutions for Motion Sensing in Handheld Devices," Qualtré Inc., http://www.qualtre.com/motion-sensing-technology/, Oct. 2010, 3 pages.

(Continued)

*Primary Examiner* — Helen Kwok
(74) *Attorney, Agent, or Firm* — Sunstein Kann Murphy & Timbers LLP

(57) ABSTRACT

One or more electrodes that interact with a movable mass in a MEMS device are anchored or otherwise supported from both the top and bottom and optionally also from one or more of the lateral sides other than the transduction side (i.e., the side of the electrode facing the mass) in order to severely restrict movement of the electrodes such as from interaction with the mass and/or external forces.

23 Claims, 11 Drawing Sheets

(56) References Cited

U.S. PATENT DOCUMENTS

| | | | |
|---|---|---|---|
| 5,937,275 A | 8/1999 | Munzel et al. | 438/50 |
| 5,992,233 A | 11/1999 | Clark | 73/514.35 |
| 6,105,427 A * | 8/2000 | Stewart et al. | 73/514.32 |
| 6,151,964 A | 11/2000 | Nakajima | 73/504.13 |
| 6,158,280 A * | 12/2000 | Nonomura et al. | 73/504.04 |
| 6,209,393 B1 | 4/2001 | Tomikawa et al. | 73/504.12 |
| 6,240,781 B1 | 6/2001 | Namerikawa et al. | 73/504.13 |
| 6,401,534 B1 | 6/2002 | Fell et al. | 73/504.13 |
| 6,438,242 B1 | 8/2002 | Howarth | 381/190 |
| 6,635,509 B1 | 10/2003 | Ouellet | 438/106 |
| 6,848,305 B2 | 2/2005 | Fell et al. | 73/504.13 |
| 6,877,374 B2 | 4/2005 | Geen | 73/504.14 |
| 6,892,575 B2 | 5/2005 | Nasiri et al. | 73/504.12 |
| 6,958,566 B2 * | 10/2005 | Nguyen et al. | 310/321 |
| 6,985,051 B2 | 1/2006 | Nguyen et al. | 333/186 |
| 7,032,451 B2 | 4/2006 | Geen | 73/504.14 |
| 7,043,985 B2 | 5/2006 | Ayazi et al. | 73/504.04 |
| 7,051,590 B1 | 5/2006 | Lemkin et al. | 73/504.04 |
| 7,089,792 B2 | 8/2006 | Geen | 73/504.14 |
| 7,134,340 B2 | 11/2006 | Samuels et al. | 73/514.32 |
| 7,178,378 B2 | 2/2007 | Crawley et al. | 73/24.06 |
| 7,204,144 B2 | 4/2007 | Geen | 73/504.14 |
| 7,216,539 B2 | 5/2007 | Geen | 73/504.14 |
| 7,216,541 B2 * | 5/2007 | Kato et al. | 73/514.32 |
| 7,357,025 B2 | 4/2008 | Geen | 73/504.12 |
| 7,420,318 B1 | 9/2008 | Pulskamp | 310/328 |
| 7,427,819 B2 | 9/2008 | Hoen et al. | 310/320 |
| 7,444,870 B2 * | 11/2008 | Uchiyama et al. | 73/504.12 |
| 7,492,241 B2 | 2/2009 | Piazza et al. | 333/189 |
| 7,543,496 B2 | 6/2009 | Ayazi et al. | 73/504.12 |
| 7,551,043 B2 | 6/2009 | Nguyen et al. | 333/186 |
| 7,578,186 B2 * | 8/2009 | Matsuhisa | 73/504.12 |
| 7,581,443 B2 | 9/2009 | Kubena et al. | 73/504.12 |
| 7,637,156 B2 | 12/2009 | Araki et al. | 73/504.13 |
| 7,874,209 B2 | 1/2011 | Stewart | 73/504.01 |
| 7,878,060 B2 * | 2/2011 | Yoshikawa | 73/504.04 |
| 7,895,892 B2 | 3/2011 | Aigner | 73/504.01 |
| 8,056,413 B2 | 11/2011 | Yazdi | 73/504.13 |
| 8,146,425 B2 * | 4/2012 | Zhang et al. | 73/514.32 |
| 8,166,816 B2 | 5/2012 | Ayazi et al. | 73/504.12 |
| 8,616,056 B2 | 12/2013 | Sammoura et al. | 73/504.13 |
| 8,631,700 B2 | 1/2014 | Sammoura et al. | 73/504.12 |
| 2002/0029637 A1* | 3/2002 | Matsumoto et al. | 73/504.01 |
| 2003/0051550 A1* | 3/2003 | Nguyen et al. | 73/514.36 |
| 2003/0119220 A1 | 6/2003 | Mlcak et al. | 438/52 |
| 2003/0183888 A1 | 10/2003 | Bar-Sadeh et al. | 257/419 |
| 2004/0051595 A1 | 3/2004 | Yoshimine et al. | 331/158 |
| 2004/0085000 A1 | 5/2004 | Ogiura | 310/329 |
| 2005/0072230 A1 | 4/2005 | Koike et al. | 73/504.12 |
| 2005/0148065 A1 | 7/2005 | Zhang et al. | 435/287.2 |
| 2006/0133953 A1 | 6/2006 | Zhang et al. | 422/58 |
| 2006/0196253 A1 | 9/2006 | Crawley et al. | 73/53.01 |
| 2006/0197411 A1 | 9/2006 | Hoen et al. | 310/320 |
| 2006/0237806 A1 | 10/2006 | Martin et al. | 257/415 |
| 2006/0238078 A1 | 10/2006 | Liu | 310/320 |
| 2007/0046398 A1 | 3/2007 | Nguyen et al. | 333/186 |
| 2007/0172940 A9 | 7/2007 | Manalis et al. | 435/287.2 |
| 2007/0220971 A1 | 9/2007 | Ayazi et al. | 73/504.02 |
| 2007/0256495 A1 | 11/2007 | Watson | 73/504.12 |
| 2007/0284971 A1 | 12/2007 | Sano et al. | 310/364 |
| 2008/0054759 A1* | 3/2008 | Ayazi et al. | 310/309 |
| 2008/0168838 A1* | 7/2008 | Martin et al. | 73/514.32 |
| 2008/0180890 A1 | 7/2008 | Bolis | 361/679 |
| 2008/0190181 A1 | 8/2008 | Khuri-Yakub et al. | 73/64.53 |
| 2008/0282833 A1 | 11/2008 | Chaumet | 74/5 R |
| 2009/0095079 A1* | 4/2009 | Ayazi | 73/514.29 |
| 2009/0114016 A1* | 5/2009 | Nasiri et al. | 73/504.12 |
| 2009/0173157 A1 | 7/2009 | Stewart | 73/504.12 |
| 2009/0173158 A1 | 7/2009 | Gehring | 73/590 |
| 2009/0188317 A1 | 7/2009 | Aigner | 73/504.01 |
| 2009/0241662 A1* | 10/2009 | Supino et al. | 73/504.12 |
| 2009/0266162 A1 | 10/2009 | Ayazi et al. | 73/504.12 |
| 2009/0277271 A1 | 11/2009 | Seppa et al. | 73/627 |
| 2010/0058861 A1 | 3/2010 | Kuang et al. | 73/504.12 |
| 2010/0148341 A1* | 6/2010 | Fuji et al. | 257/686 |
| 2010/0263445 A1 | 10/2010 | Hayner et al. | 73/504.12 |
| 2010/0294039 A1 | 11/2010 | Geen | 73/504.12 |
| 2011/0048131 A1* | 3/2011 | Reinmuth | 73/504.12 |
| 2011/0192226 A1 | 8/2011 | Hayner et al. | 73/504.12 |
| 2011/0254599 A1 | 10/2011 | Dikshit et al. | 327/156 |
| 2012/0013774 A1 | 1/2012 | Kim et al. | 348/246 |
| 2012/0111112 A1 | 5/2012 | Sammoura et al. | 73/514.01 |
| 2012/0111113 A1 | 5/2012 | Sammoura et al. | 73/514.01 |
| 2012/0112765 A1 | 5/2012 | Sparks et al. | 324/633 |
| 2012/0137773 A1 | 6/2012 | Judy et al. | 73/504.12 |
| 2012/0137774 A1 | 6/2012 | Judy et al. | 73/504.12 |
| 2012/0195797 A1 | 8/2012 | Sparks et al. | 422/69 |
| 2012/0227487 A1 | 9/2012 | Ayazi et al. | 73/504.08 |

FOREIGN PATENT DOCUMENTS

| | | | |
|---|---|---|---|
| EP | 2 078 925 | 7/2009 | G01C 19/56 |
| EP | 2216904 | 8/2010 | H03H 9/25 |
| JP | 9116250 | 5/1997 | H05K 1/18 |
| JP | 2004 301734 | 10/2004 | G01C 19/56 |
| JP | 2008-64742 | 3/2008 | G01P 21/00 |
| JP | 2009-531707 | 9/2009 | G01C 19/56 |
| WO | WO 2007/061610 | 5/2007 | H01L 41/08 |
| WO | WO 2009/066640 | 5/2009 | H03H 9/25 |

OTHER PUBLICATIONS

Ayazi et al., "High Aspect-Ratio Combined Poly and Single-Crystal Silicon (HARPSS) MEMS Technology;" Journal of Microelectromechanical Systems, vol. 9, No. 3, Sep. 2000.

Ayazi et al., "Design and Fabrication of a High-Performance Polysilicon Vibrating Ring Gyroscope;" Center for Integrated Sensors and Circuits; Eleventh IEEE/ASME International Workshop on Micro Electro Mechanical Systems, Heidelberg, Germany, Jan. 25-29, 1998.

Ayazi et al., "A HARPSS Polysilicon Vibrating Ring Gyroscope;" Journal of Microelectromechanical Systems, vol. 10, No. 2, Jun. 2001.

Benes et al., "Comparison Between BAW and SAW Sensor Principles," *IEEE Transactions on Ultrasonics, Ferroelectrics and Frequency Control*, vol. 45 No. 5, Sep. 1998, pp. 1314-1330, 17 pages.

Bernstein, "An Overview of MEMS Inertial Sensing Technology," *Sensors*, http://www.sensorsmag.com/sensors/acceleration-vibration/an-overview-mems-inertial-sensing-technology-970 , Feb. 1, 2003, 6 pages.

Celikel et al., "Optoelectronic Design Parameters of Interferometric Fiber Optic Gyroscope with LiNbO3 Having North Finder Capability and Earth Rotation Rate Measurement," *Indian Journal of Pure & Applied Physics*, vol. 48, pp. 375-384, Jun. 2010, 10 pages.

Doe, "Qualtré Targets 3-Axis Gyro Market with Alternative Technology," *MEMS Trends*, Issue No. 3, pp. 8, Jul. 2010, 1 page.

Drafts, "Acoustic Wave Technology Sensors," Sensors (www.sensorsmag.com), 5 pages, Oct. 1, 2000.

Dubois, "Thin film bulk acoustic wave resonators: a technology overview," MEMSWAVE 03, Toulouse, France, 4 pages, Jul. 2-4, 2003.

Geen et al., New iMEMS® Angular-Rate-Sensing Gyroscope; ADI Micromachined Products Division; Analog Dialogue 37-8 (2003).

Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, Dec. 2008, 201 pages.

Johari, et al. "High-Frequency Capacitive Disk Gyroscope in (100) and (111) Silicon," School of Electrical and Computer Engineering, Georgia Institute of Technology, MEMS 2007, pp. 47-50, Jan. 2007, 4 pages.

Johari et al., "Capacitive Bulk Wave Silicon Disk Gyroscopes," Electron Devices Meeting, Dec. 1, 2006, 4 pages.

Johnson, "Qualtre Preps Solid State MEMS Gyros," *MEMS Investor Journal*, http://www.memsinvestorjournal.com/2010/04/qualtre-preps-solidstate-mems-gyros.html_, Apr. 8, 2010, 2 pages.

Link, "Angular Rate Detector DAVED® -RR," Application Report SE 090.2; Institute of Micromachining and Information Technology,

(56) References Cited

OTHER PUBLICATIONS 1 page, Dec. 11, 2007, http://hsgimit.de/fileadmn/gfx/pdfs/AnwendungsberichtSE090_2rr_englisch_V1.pdf.

Link, "Angular Rate Detector DAVED® -LL," Application Report SE 100.1; Institute of Micromachining and Information Technology, 1 page, Dec. 11, 2007,hsg-imit.de/fileadmin/gfx/pdfs/anwendungsberichtse100_1ll_englisch01.pdf.

Nasiri, "A Critical Review of MEMS Gyroscopes Technology and Commercialization Status," InvenSense, 8 pages, 2005, www.scantec.de/uploads/mdia/MEMSGyroComp_02.pdf.

Ramirez, "PZE Energy Harvester," *45 RF MEMS Based Circuit Design*—conocimeintos.com.ve, http://conocimientosrfmemsdesign.blogspot.com/2010/07/pze-energy-harvester.html , Jul. 24, 2010, 4 pages.

Satrom et al., "Disc Resonating Gyroscopes: A Summary of a Recent Development in MEMS Technology," Northwestern University, http://www.google.com/url?sa=t&rct=j&q=&esrc=s&frm=1&source=web&cd=1&sqi=2&ved=0CCQQFjAA&url=http%3A%2F%2Fclifton.mech.northwestern.edu%2F~me381%2Fproject%2F06fall%2FFruthSatrom.pdf&ei=ZOsyT6D3IMjMrQfE6qSnDA&usg=AFQjCNFXOj00sAsF6bMdfEV70D7JzzLkBw&sig2=jwpU1Tgot45sT_fgi81zMw , Dec. 1, 2006, 15 pages.

Saukoski, "System and Circuit Design for a Capacitive MEMS Gyroscope," Doctoral Dissertation, TKK Dissertations 116, Helsinki University of Technology, 279 pages (2008).

Yang et al., "An electro-thermal bimorph-based microactuator for precise track-positioning of optical disk drives;" J. Micromech. Microeng., v. 15 (2005) 958-965 Journal of Micromechanics and Microengineering.

Jonathan Grant, Third Party Submission under 37 C.F.R. § 1.290 for U.S. Appl. No. 12/983,476, 8 pages, dated Nov. 6, 2012.

Jonathan Grant, Third Party Submission under 37 C.F.R. § 1.290 for U.S. Appl. No. 13/308,687, 8 pages, dated Nov. 6, 2012.

International Searching Authority, International Search Report and Written Opinion—International Application No. PCT/US2009/056456, Feb. 16, 2010, 18 pages.

International Searching Authority, International Search Report and Written Opinion—International Application No. PCT/US2010/044994, dated Nov. 3, 2010, 11 pages.

International Searching Authority, International Search Report and Written Opinion—International Application No. PCT/US2011/062785, dated Feb. 3, 2012, 8 pages.

International Searching Authority, Invitation to Pay Additional Fees and, Where Applicable, Protest Fee; European Patent Office, International Application No. PCT/US2011/062966, 6 pages, dated Feb. 3, 2012.

International Searching Authority, International Search Report and Written Opinion, International Application No. PCT/US2011/062966, Apr. 12, 2012, 15 pages.

International Searching Authority, Invitation to Pay Additional Fees and, Where Applicable, Protest Fee, International Application No. PCT/US2011/062961, May 8, 2012, 8 pages.

International Searching Authority, International Search Report and Written Opinion, International Application No. PCT/US2011/058908, Jan. 17, 2012, 11 pages.

* cited by examiner

APPARATUS AND METHOD FOR ANCHORING ELECTRODES IN MEMS DEVICES

RELATED PATENT APPLICATIONS

This patent application claims the benefit of U.S. Provisional Patent Application No. 61/418,668 entitled SHELL-TYPE GYROSCOPE WITH REDUCED LINEAR ACCELERATION SENSITIVITY filed on Dec. 1, 2010, the disclosure of which is hereby incorporated herein, in its entirety, by reference.

This patent application is related to U.S. patent application Ser. No. 12/940,354, entitled, "Resonating Sensor with Mechanical Constraints," filed Nov. 5, 2010, and naming Firas Sammoura and William Sawyer as inventors, the disclosure of which is incorporated herein, in its entirety, by reference.

This patent application also is related to U.S. provisional patent application No. 61/418,675 entitled NON-DEGENERATE SHELL-TYPE GYROSCOPE, filed on Dec. 1, 2010 and having the same assignee, the disclosure of which is incorporated herein, in its entirety, by reference.

TECHNICAL FIELD

The invention generally relates to MEMS devices and, more particularly, the invention relates to anchoring of electrodes in MEMS devices.

BACKGROUND ART

In many MEMS device (e.g., MEMS gyroscopes, accelerometers, resonators, switches, and other types of devices), movement of a mass may be driven, adjusted, and/or sensed using one or more electrodes placed at least partially adjacent to the mass. Such interaction between the electrode and the mass may be electrostatic, although other types of configurations may be used (e.g., piezoelectric). For example, as shown schematically in FIG. 1, an electrode 604 may be placed adjacent to a mass 602 in substantially the same plane as the mass 602. FIG. 1A shows a side view and FIG. 1B shows a top view of an exemplary mass/electrode system. Typically, the electrode 604 is formed on or otherwise anchored to an underlying substrate or support structure (not shown). The electrode 604 also may be attached or otherwise anchored laterally to a side structure. The electrode 604 may be constructed in whole or in part from the same material as the mass 602 (e.g., the mass 602 and electrode 604 may be formed from the top silicon layer of a silicon-on-insulator wafer) and/or may include other materials/layers (e.g., formed by deposition of one or more materials on the silicon wafer).

Ideally, the electrode 604 is perfectly stationary, with a precise gap between the electrode 604 and the stationary mass 602. In practice, however, any of a number of factors can cause the electrode 604 to move, even slightly, and such movements can introduce errors into the system. For example, the electrode 604 may deflect due to movement of the device (e.g., an acceleration) and/or electrostatic interaction of the electrode 604 with the mass 602. Among other things, the electrode may move or pivot out-of-plane as depicted by arrows 605 and 606, may move toward or away from the mass 603 in-plane as depicted by arrows 607, may pivot in-plane as depicted by arrows 608 and 609, and/or may translate sideways within the plane as depicted by arrows 612.

Of course, other mass/electrode configurations are often used in MEMS devices, such as electrodes placed entirely or partially above or below the mass, or electrode "fingers" interdigitated with corresponding structures on the mass. Furthermore, other types of electrodes are often used in MEMS devices, such as piezoelectrically coupled electrodes. Such electrodes are similarly subject to movements that can cause erroneous behavior, such as increased sensitivity to external forces (i.e., unwanted forces such as unwanted acceleration), erroneous signals, and reduced performance in MEMS devices such as gyroscopes, accelerometers, and other types of MEMS devices.

U.S. Pat. No. 7,134,340, which is hereby incorporated herein by reference in its entirety, discloses elongated finger structures (e.g., drive and/or sense electrodes) including elongated or multiple anchors to mitigate certain types of electrode movements, particularly pivoting/twisting movements in-plane about the anchor point.

Bulk acoustic wave ("BAW") gyroscope use has increased in recent years. This trend is driven by their many benefits including, among other things, their high gain factor, which causes them to use less power than conventional gyroscopes. In addition, such gyroscopes generally cost less to manufacture.

To those ends, many bulk acoustic wave gyroscopes known to the inventors have a proof mass (with any polygon shape, e.g., circular or rectangular) with a crystal lattice that, during either or both an actuation or detection phase, vibrates/resonates at a very high frequency, typically in the megahertz range. This is in contrast to gyroscopes having a mass mechanically moving back and forth about a substrate in both phases. When the crystal lattice of the mass vibrates, the mass is considered to be operating in a "bulk" mode.

Some exemplary BAW gyroscope configurations are discussed in Johari, H., Micromachined Capacitive Silicon Bulk Acoustic Wave Gyroscopes, Georgia Institute of Technology, December 2008 and in the following U.S. patents and published patent applications: U.S. Pat. No. 7,895,892, U.S. Pat. No. 7,874,209, U.S. Pat. No. 7,543,496, U.S. Pat. No. 7,427,819, US 2009/0266162, US 2008/0180890, US 2008/0054759, US 2007/0284971, and US 2006/0238078, each of which is hereby incorporated herein by reference in its entirety.

In addition to being subject to external forces, the drive and sense electrodes in shell-type MEMS gyroscopes (e.g., flexure mode and BAW mode gyroscopes) may be subject to very high forces due in part to the high frequencies of operation of such devices, and such forces can deflect the electrodes which in turn can distort the angular rate sensitivity of the gyroscope, causing errors in the system.

SUMMARY OF EXEMPLARY EMBODIMENTS

In embodiments of the present invention, one or more electrodes that interact with a movable mass in a MEMS device are anchored or otherwise supported from both the top and bottom and optionally also from one or more of the lateral sides other than the transduction side (i.e., the side of the electrode facing the mass) in order to severely restrict movement of the electrodes such as from interaction with the mass and/or external forces. Constraint of the electrodes using top and bottom anchoring with optional side anchoring may be useful in MEMS devices generally but may be particularly useful in devices where the electrodes are subject to very high forces, such as for drive and/or sense electrodes in shell-type gyroscopes (e.g., BAW gyroscopes) that operate at very high frequencies (e.g., in the megahertz range) with very small gaps between the electrodes and the mass (e.g., in the nanometer range, particularly 100 nm-200 nm) or flexure gyroscopes that operate in the kilohertz range, where such constraint generally reduces deflection of electrodes from external forces (e.g., movement of the MEMS device) and/or internal forces (e.g., interaction of the electrodes with the movable mass) and there generally improves sensitivity and overall performance and also may allow for smaller gaps between the electrodes and surrounding structures such as the movable mass, adjacent electrodes, etc. Constraint of the electrodes using top and bottom anchoring with optional side anchoring may be used in combination with top and bottom anchoring of the mass to further mitigate erroneous behavior.

In accordance with aspect of the invention, a MEMS device includes a movable mass and at least one electrode configured to interact with the mass, the electrode having a top surface substantially parallel with a top surface of the movable mass and a bottom surface substantially parallel with a bottom surface of the movable mass, wherein the top surface of the electrode is anchored to a overlying support structure and wherein the bottom surface of the electrode is anchored to an underlying support structure in order to constrain movement of the electrode.

In various alternative embodiments of such a MEMS device, the at least one electrode may be configured to interact with the mass electrostatically. The electrode may be anchored to the top support structure via a plurality of top anchors and may be anchored to the bottom support structure via a plurality of bottom anchors. The electrode may be further anchored by at least one surface other than the top surface and bottom surface to at least one side support structure. The electrode may be formed on an electrode support structure, in which case the electrode may include at least one side anchor through at least a portion of the electrode support structure. The electrode support structure and the mass may be fabricated from a common layer of material, such as from the top silicon layer of an SOI wafer or from a common deposited layer of material, or may be made from different materials/layers. Electrodes may be configured for driving and/or sensing movement of the mass. The top support structure may be a device cap. The bottom support structure may be a device substrate or cap.

Embodiments of the above-described invention may include virtually any type of MEMS device, including MEMS gyroscopes, accelerometers, resonators, and switches, to name but a few.

In certain embodiments, a MEMS gyroscope includes a resonant mass and at least one electrode configured to interact with the mass, the electrode having a top surface substantially parallel with a top surface of the movable mass and a bottom surface substantially parallel with a bottom surface of the movable mass, wherein the top surface of the electrode is anchored to a overlying support structure and wherein the bottom surface of the electrode is anchored to an underlying support structure in order to constrain movement of the electrode.

In various alternative embodiments of such a MEMS gyroscope, the at least one electrode may be configured to interact with the mass electrostatically. The electrode may be anchored to the top support structure via a plurality of top anchors and may be anchored to the bottom support structure via a plurality of bottom anchors. The electrode may be further anchored by at least one surface other than the top surface and bottom surface to at least one side support structure. The electrode may be formed on an electrode support structure, in which case the electrode may include at least one anchor through at least a portion of the electrode support structure. The anchor through at least a portion of the electrode support structure may be formed by trench refilling with a conductive or non-conductive material. The electrode support structure and the mass may be fabricated from a common layer of material, such as from the top silicon layer of an SOI wafer or from a common deposited layer of material. Electrodes may be configured for driving and/or sensing movement of the mass. The top support structure may be a device cap. The bottom support structure may be a device substrate or cap.

The MEMS gyroscope may be a shell-type gyroscope in which the resonant mass is configured to resonate in a flexure mode or bulk mode in response to receipt of an electrostatic signal, and the at least one electrode may be configured for at least one of driving and sensing movement of the resonant mass. The top surface of the resonant mass may be anchored to an overlying support structure and the bottom surface of the resonant mass may be anchored to an underlying support structure in order to constrain movement of the resonant mass, in which case the top surface of the electrode and the top surface of the resonant mass may be anchored to the same overlying support structure or to different overlying support structures, and, similarly, the bottom surface of the electrode and the bottom surface of the resonant mass may be anchored to the same underlying support structure or to different underlying support structures.

Embodiments also may include a method for forming a MEMS device having a movable mass and at least one electrode configured to interact with the mass, the electrode having a top surface substantially parallel with a top surface of the movable mass and a bottom surface substantially parallel with a bottom surface of the movable mass the method including anchoring the top surface of the electrode to a overlying support structure and anchoring the bottom surface of the electrode to an underlying support structure in order to constrain movement of the electrode.

In alternative embodiments, the method may further include anchoring the electrode by at least one surface other than the top surface and bottom surface to at least one side support structure.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is rotated 180 degrees from FIG. 10, which is oriented appropriately for use of the terms "top" and "bottom."

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

In embodiments of the present invention, one or more electrodes that interact with a movable mass in a MEMS device are anchored or otherwise supported from both the top and bottom and optionally also from one or more of the lateral sides other than the transduction side (i.e., the side of the electrode facing the mass) in order to severely restrict movement of the electrodes such as from interaction with the mass and/or external forces. Constraint of the electrodes using top and bottom anchoring with optional side anchoring may be useful in MEMS devices generally but may be particularly useful in devices where the electrodes are subject to very high forces, such as for drive and/or sense electrodes in shell-type gyroscopes (e.g., BAW gyroscopes) that operate at very high frequencies (e.g., in the megahertz range) with very small gaps between the electrodes and the mass (e.g., in the nanometer range, particularly 100 nm-200 nm) or flexure gyroscopes that operate in the kilohertz range, where such constraint generally reduces deflection of electrodes from external forces (e.g., movement of the MEMS device) and/or internal forces (e.g., interaction of the electrodes with the movable mass) and there generally improves sensitivity and overall performance and also may allow for smaller gaps between the electrodes and surrounding structures such as the movable mass, adjacent electrodes, etc. Constraint of the electrodes using top and bottom anchoring with optional side anchoring may be used in combination with top and bottom anchoring of the mass to further mitigate erroneous behavior.

Figure 1A:
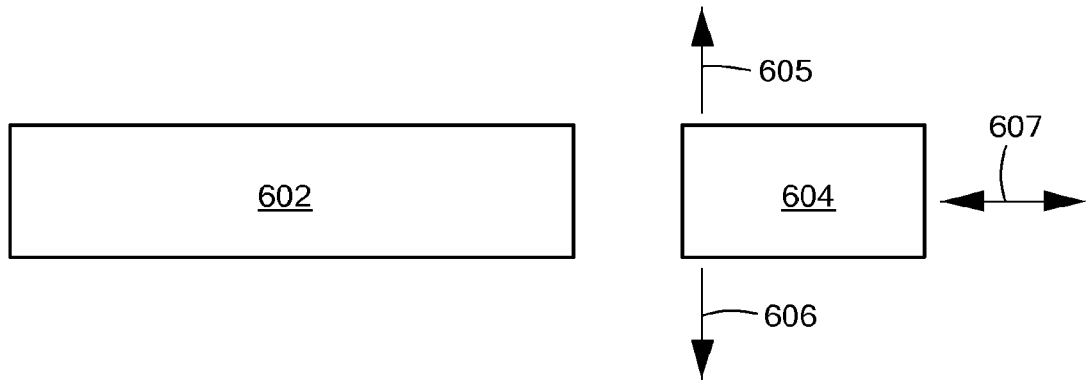
FIGS. 1A and 1B schematically show various types of electrode movements that can occur in a MEMS device.
Figure 1B:
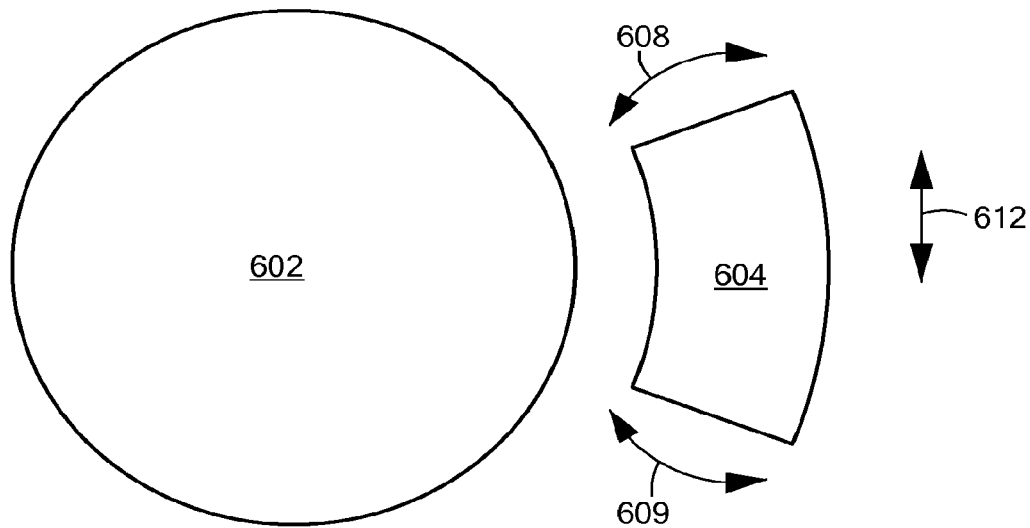
Figure 2:
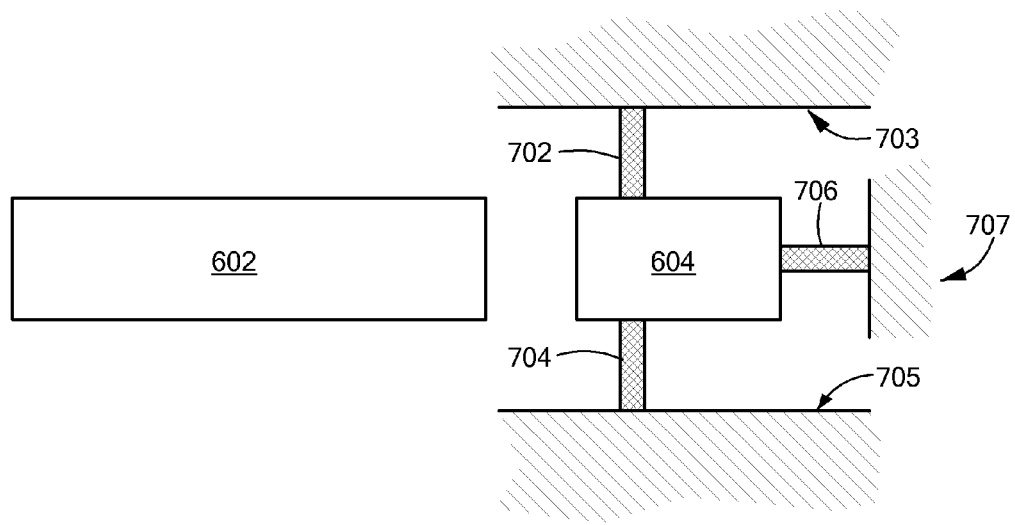
FIG. 2 schematically shows an electrode anchored to an underlying (bottom) structure by one or more bottom anchors and anchored to an overlying (top) structure by one or more top anchors, in accordance with certain exemplary embodiments of the present invention.

FIG. 2 schematically shows the electrode 604 anchored to an underlying (bottom) structure 705 by one or more bottom anchors 704 and anchored to an overlying (top) structure 703 by one or more top anchors 702. Various embodiments may include multiple top and/or bottom anchors in order to further constrain the electrode 604. Additionally or alternatively, various embodiments may use specially-shaped anchors (e.g., elongated or otherwise non-round anchors) to further constrain the electrode 604.

It should be noted that one or both of the support structures 703 and 705 may support the mass 602 or may be separate from a mass support structure. In some embodiments, the bottom support 705 may be the substrate on which the remaining MEMS device structures are formed (e.g., the bottom silicon layer or oxide layer of an SOI wafer), while in other embodiments, the bottom support 705 may be a structure above the base substrate. Similarly, in some embodiments, the top support 703 may be a device cap or other top structure, while in other embodiments, the top support 703 may be a structure below the device cap or other top structure.

FIG. 2 also shows the electrode 604 optionally anchored to a lateral (side) structure 707 by one or more side anchors 706. Thus, certain embodiments include just top and bottom anchors while other embodiments include top, bottom, and side anchors, and a particular MEMS device may include one or more anchors with just top and bottom anchors and one or more anchors with top, bottom, and side anchors.

It should be noted that the anchors and other structures shown in FIG. 2 are represented schematically, and no limitation is placed on the types of anchors and other structures including the materials from which they are made, the manner in which they are fabricated, and the manner in which they are interconnected or otherwise attached. Thus, any of a variety of techniques may be used to form an electrode anchored to top and bottom structures and optionally anchored to a side structure, such as, for example, micromachining techniques (e.g., material deposition, patterning, and etching processes), wafer bonding processes, conductive and non-conductive bonding techniques, and other fabrication techniques.

Figure 3:
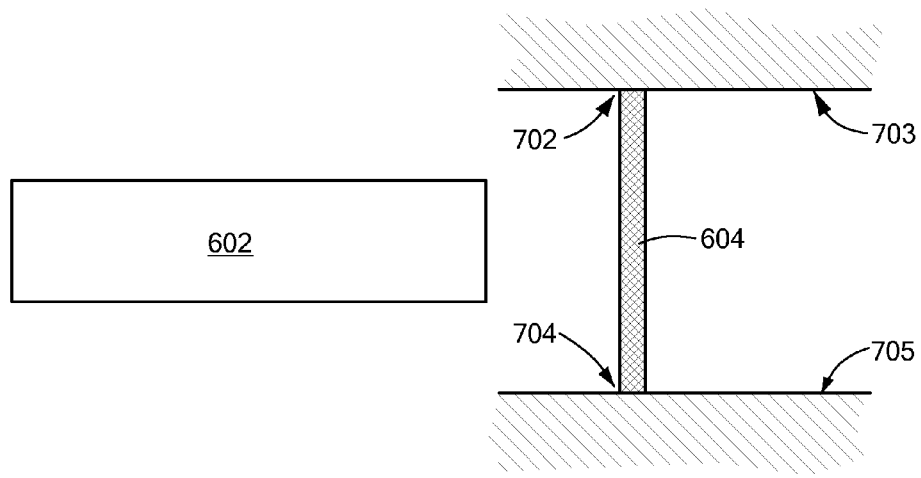
FIG. 3 schematically shows an elongated electrode that couples with the top and bottom support structures, in accordance with certain exemplary embodiments of the present invention.

For example, anchors may be an integral part of the electrode 604 and/or the support structure(s). For example, as depicted schematically in FIG. 3, the electrode 604 may be an elongated electrode that couples with the top and bottom structures 703 and 705. Alternatively, anchors may be formed on the electrode and coupled with the support structures, or anchors may be formed on the support structures and coupled with the electrode. Some or all of the anchors may be formed in-situ as part of the MEMS fabrication process onto, into, through, or partially through the electrode and/or support structure, in which case such anchors are generally considered to be self-aligning.

Figure 4A:
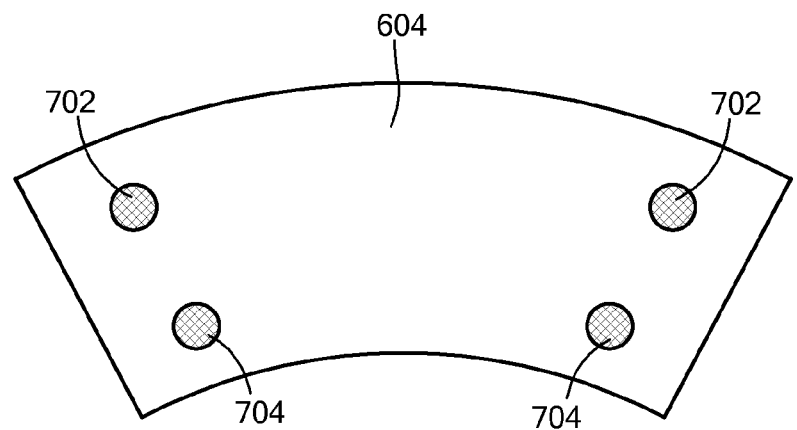
FIGS. 4A and 4B schematically show anchors protruding partially into the electrode and/or the support structure, in accordance with certain exemplary embodiments of the present invention.
Figure 4B:
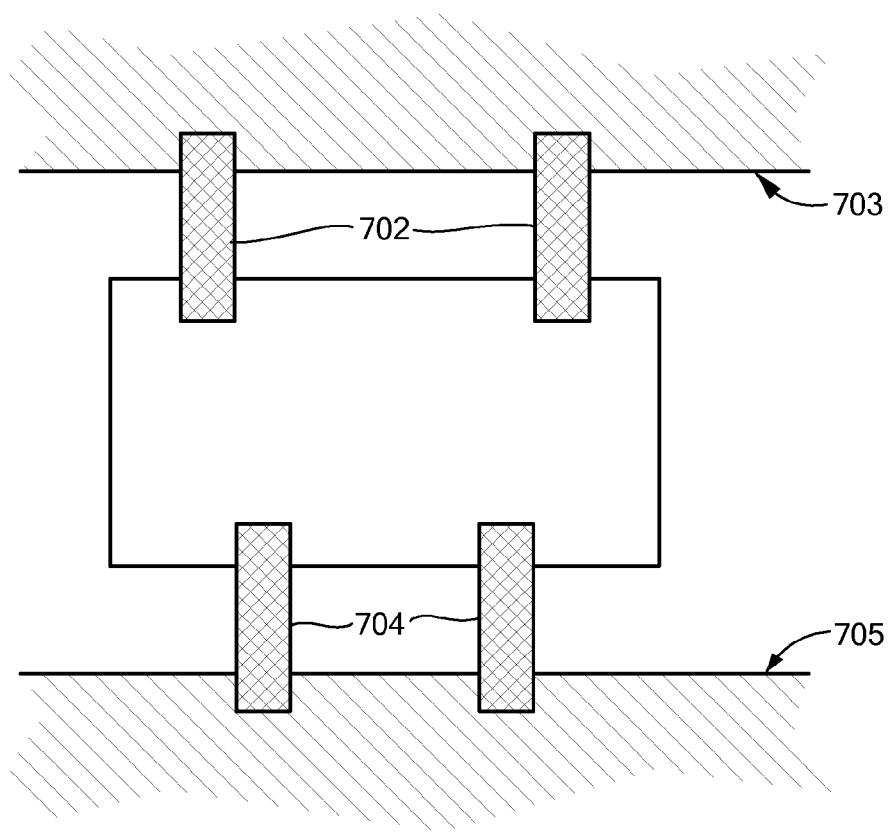

Some or all of the anchors may protrude at least partially into the electrode and/or support structure. For example, FIG. 4A shows a top perspective view and FIG. 4B shows a side cross-sectional view of an electrode 604 with the top anchors 702 protruding partially into the top structure 703 and the electrode 604 and with the bottom anchors 704 protruding partially into the bottom structure 705 and the electrode 604.

Figure 5A:
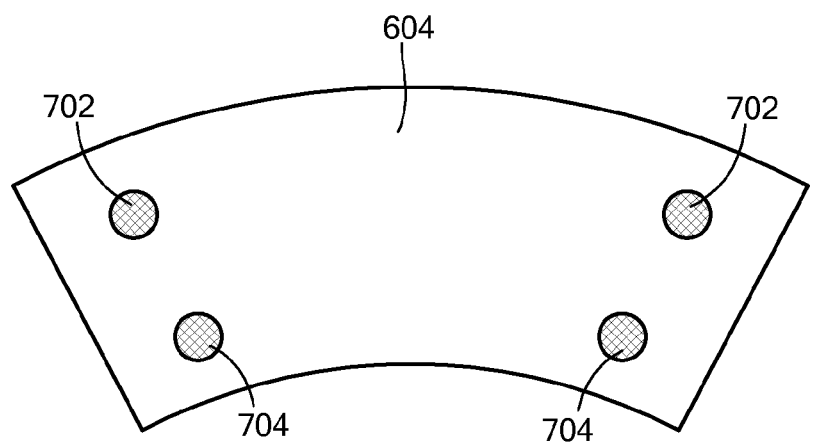
FIGS. 5A and 5B schematically show anchors that extend completely through the electrode and/or anchors that attach to the surface of the electrode and/or support structure, in accordance with certain exemplary embodiments of the present invention.
Figure 5B:
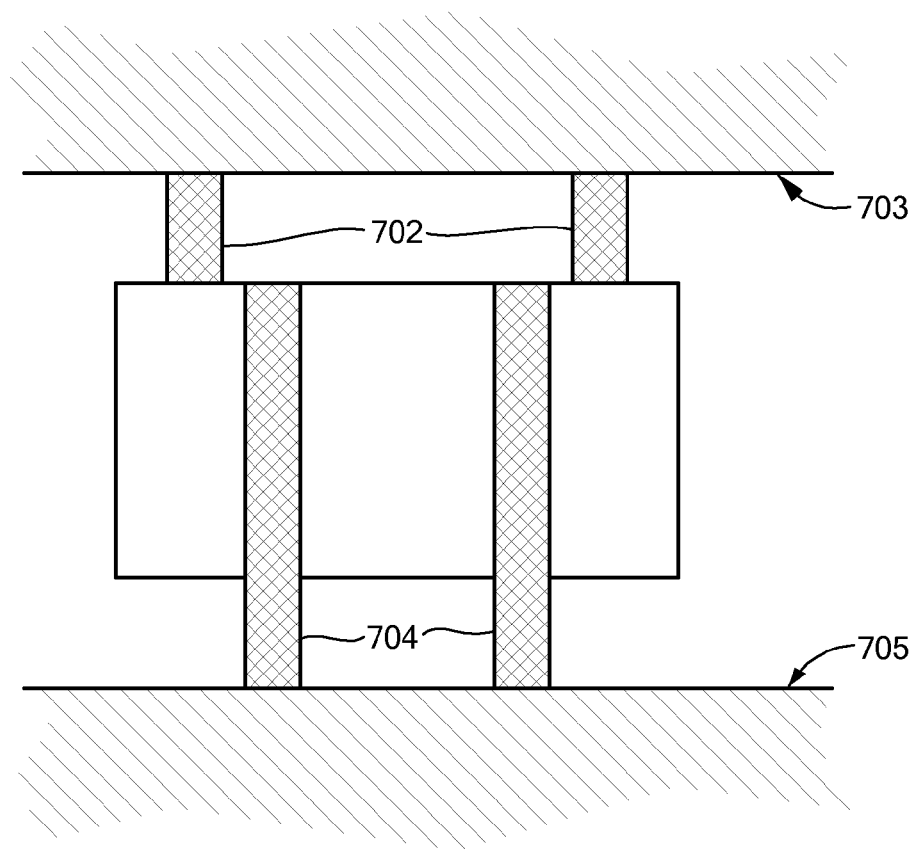

Additionally or alternatively, some or all of the anchors may extend completely through the electrode, and some or all of the anchors may attach to the surface of the electrode and/or support structure. For example, FIG. 5A shows a top perspective view and FIG. 5B shows a side cross-sectional view of an electrode 604 with the top anchors 702 attached at the surface of the electrode and/or the surface of the top support structure 703 and with the bottom anchors 704 extending through the electrode 604 to or into the bottom support structure 705.

Figure 6:
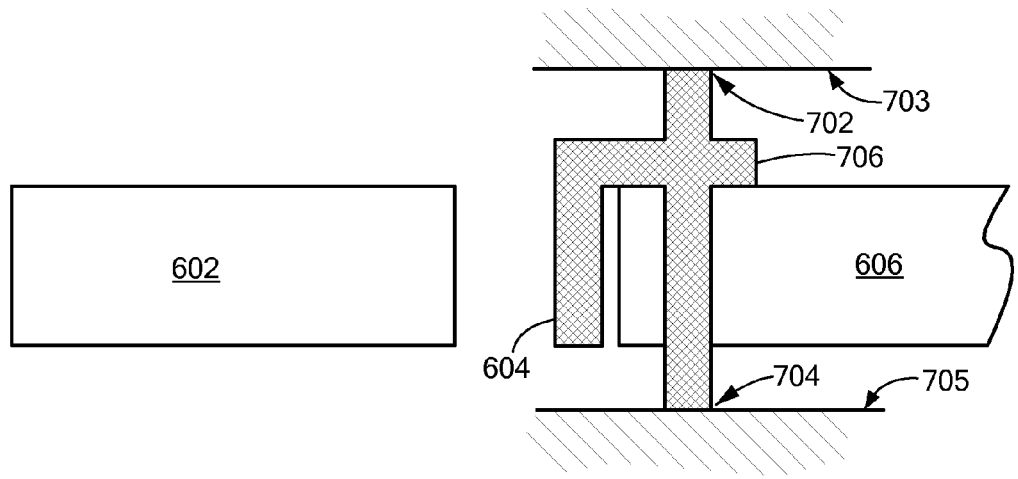
FIG. 6 schematically shows a first exemplary electrode formed on an electrode support structure, with a through-silicon anchor through the electrode support structure to the bottom support structure, in accordance with certain exemplary embodiments of the present invention.
Figure 7:
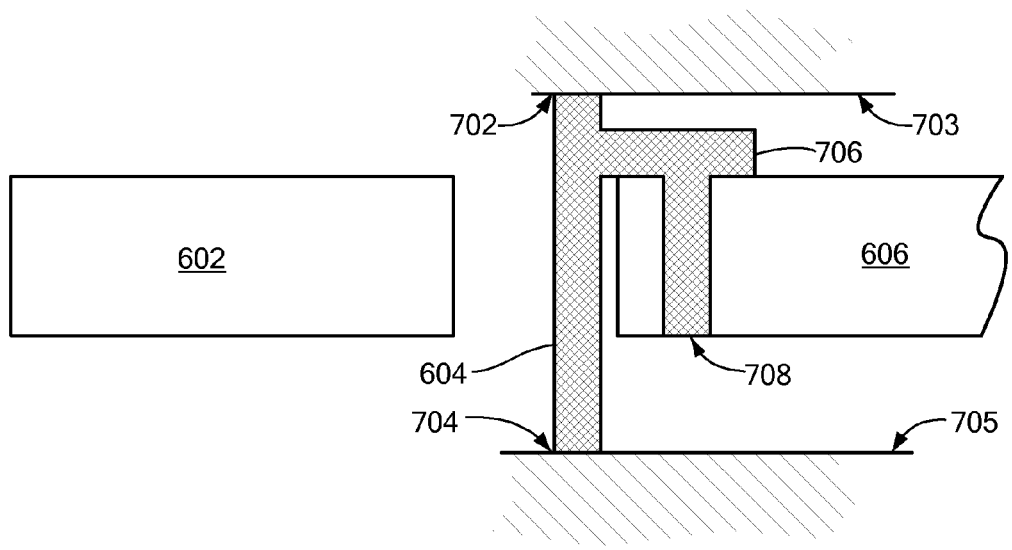
FIG. 7 schematically shows a second exemplary electrode formed on an electrode support structure, with the electrode anchored directly to the bottom support structure and a through-silicon anchor through the electrode support structure for added constraint, in accordance with certain exemplary embodiments of the present invention.

In some embodiments, the electrode 604 may be formed on a structure at least partially in the same plane as the mass 602. For example, as depicted schematically in FIGS. 6 and 7, the electrode 604 may be formed on structure 606, which at least partially supports the electrode 604 to provide added constraint. In FIG. 6, the bottom anchor 704 extends through the structure 606 to the bottom support 705, and an extended portion 706 provides additional side anchoring by virtue of being coupled to the structure 606. In FIG. 7, the top and bottom anchors 702 and 704 are coupled directly to the top and bottom supports 703 and 705, and an extended portion 706 provides additional side anchoring by virtue of being coupled to the structure 606 and also including an anchor 708 at least partially into or through the structure 606, which also may be anchored to top and/or bottom structures. In certain embodiments, the structure 606 is formed from the same material layer as the mass 602, such as, for example, the top silicon layer of an SOI wafer, although the structure 606 may be made from different materials/layers than that of the mass 602. Anchors that extend through the silicon structure 606 (e.g., the bottom anchor 704 shown in FIG. 6 or the anchor 708 shown in FIG. 7) may be referred to as through-silicon anchors and generally are formed at least in part by etching a trench through the structure 606 and refilling the trench with the anchor material, which may be conductive or not conductive (e.g., polysilicon or oxide).

Some or all of the anchors may be electrically isolated from the electrode 604, the support structure 703, the support structure 705, and/or the structure 606, e.g., using an insulating material (e.g., an oxide material), spacing, or other electrical or mechanical separation.

Illustrative embodiments are described below with reference to a shell-type gyroscope that is specially configured to mitigate the impact of linear acceleration on the determination of angular rotation. To that end, the gyroscope may have a side electrode that is anchored at up to all of its surfaces other than the transduction side. In addition, or alternatively, the gyroscope has a vibrating mass mechanically secured at both its top and bottom sides. Either or both of those sides may be secured with an anchor extending partly or fully through the vibrating mass. Details of illustrative embodiments are discussed below.

Figure 8:
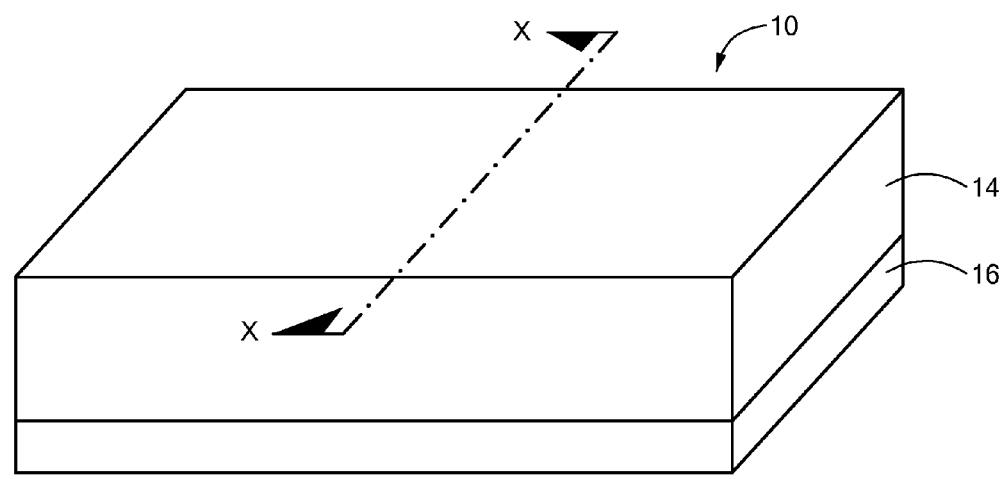
FIG. 8 schematically shows a perspective view of a packaged inertial sensor having a shell-type MEMS gyroscope (e.g., flexure-based gyroscope and/or bulk acoustic wave based gyroscope) configured in accordance with illustrative embodiments of the invention.

FIG. 8 schematically shows a perspective view of a packaged inertial sensor 10 having a shell-type MEMS gyroscope 12, such as a flexure based and/or bulk acoustic wave based gyroscope 12 (FIG. 9 and others, discussed below), configured in accordance with illustrative embodiments of the invention. This package protects its interior gyroscope 12 from the environment. As shown, the package has a top portion 14 that connects with a bottom portion 16 to form an interior (not shown) for containing the gyroscope 12. Although not necessary, some embodiments of the invention hermetically seal the package interior. Other embodiments of the package, however, do not provide a hermetic seal.

The package can be any of a variety of different types, such as, among other things, a pre-molded leadframe package, a substrate package, or a ceramic package (cavity or non-cavity packages). The top portion 14 and/or the bottom portion 16 can be planar or form a cavity. In either case, the top and bottom portions 14 and 16 should appropriately couple to protect the gyroscope 12. For example, if the top portion 14 is flat, then the bottom portion 16 should have a cavity, or there should be some spacing apparatus to form the interior with an appropriate volume for containing the gyroscope 12.

In alternative embodiments, the package is a conventional post-molded, plastic leadframe package. Specifically, as known by those skilled in the art, this relatively inexpensive package type molds plastic, in liquid form, directly around the gyroscope die 12. This packaging process therefore can damage the gyroscope 12 if it is not properly sealed. In that case, the sensitive microstructure within the gyroscope 12 preferably is hermetically sealed or otherwise protected from the molding process.

The packaged inertial sensor 10 may be used in any number of different applications. For example, it could be part of a larger guidance system in an aircraft, or part of a satellite sensor in an automobile that cooperates with a stabilization system to maintain a smooth ride. To those ends, the packaged inertial sensor 10 has a plurality of interfaces (not shown) for communicating with exterior components.

To those ends, the packaged inertial sensor 10 may have a plurality of pins (not shown) on its bottom, top, and/or side surfaces for making a mechanical and electrical connection with an underlying system, such as a printed circuit board. Alternatively, the package may have a plurality of pads (not shown) for surface mounting the package to an underlying printed circuit board. Conventional soldering techniques should suffice to make this connection. The printed circuit board may have additional components that interact with the device to both control the gyroscope die 12, and receive output signals indicating rotational acceleration of the overall system. For example, the printed circuit board also may have one or more application-specific integrated circuits (ASICs) and other circuit devices for controlling operation.

Figure 9:
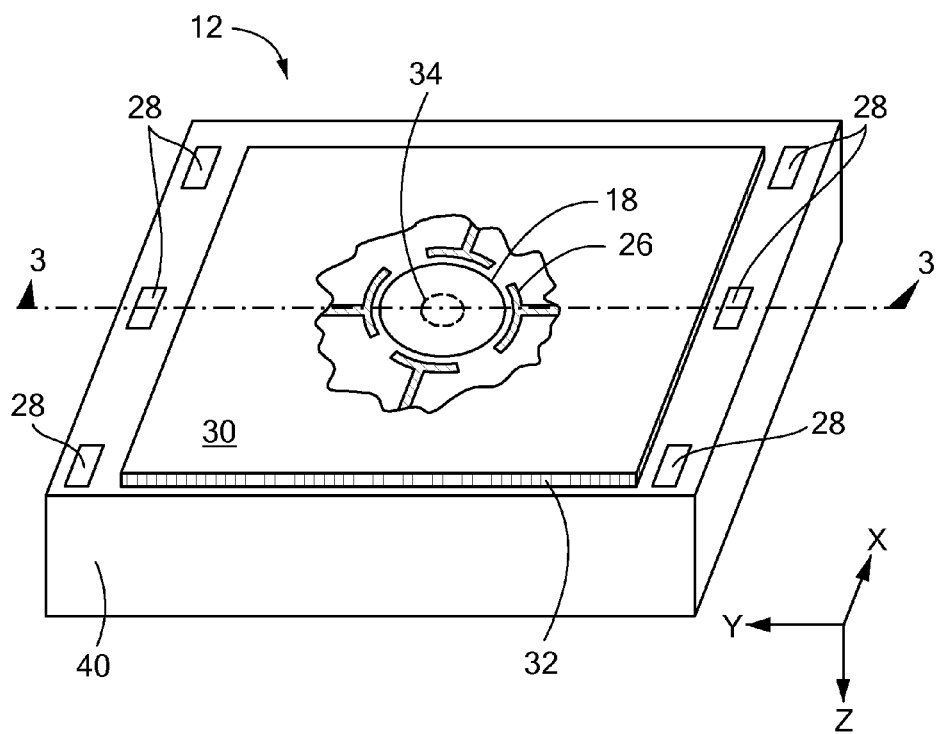
FIG. 9 schematically shows a perspective view of a shell-type MEMS gyroscope (e.g., flexure-based gyroscope and/or bulk acoustic wave based gyroscope) configured in accordance with illustrative embodiments of the invention. This figure has a partial cutaway view to show the vibrating mass.
Figure 10:
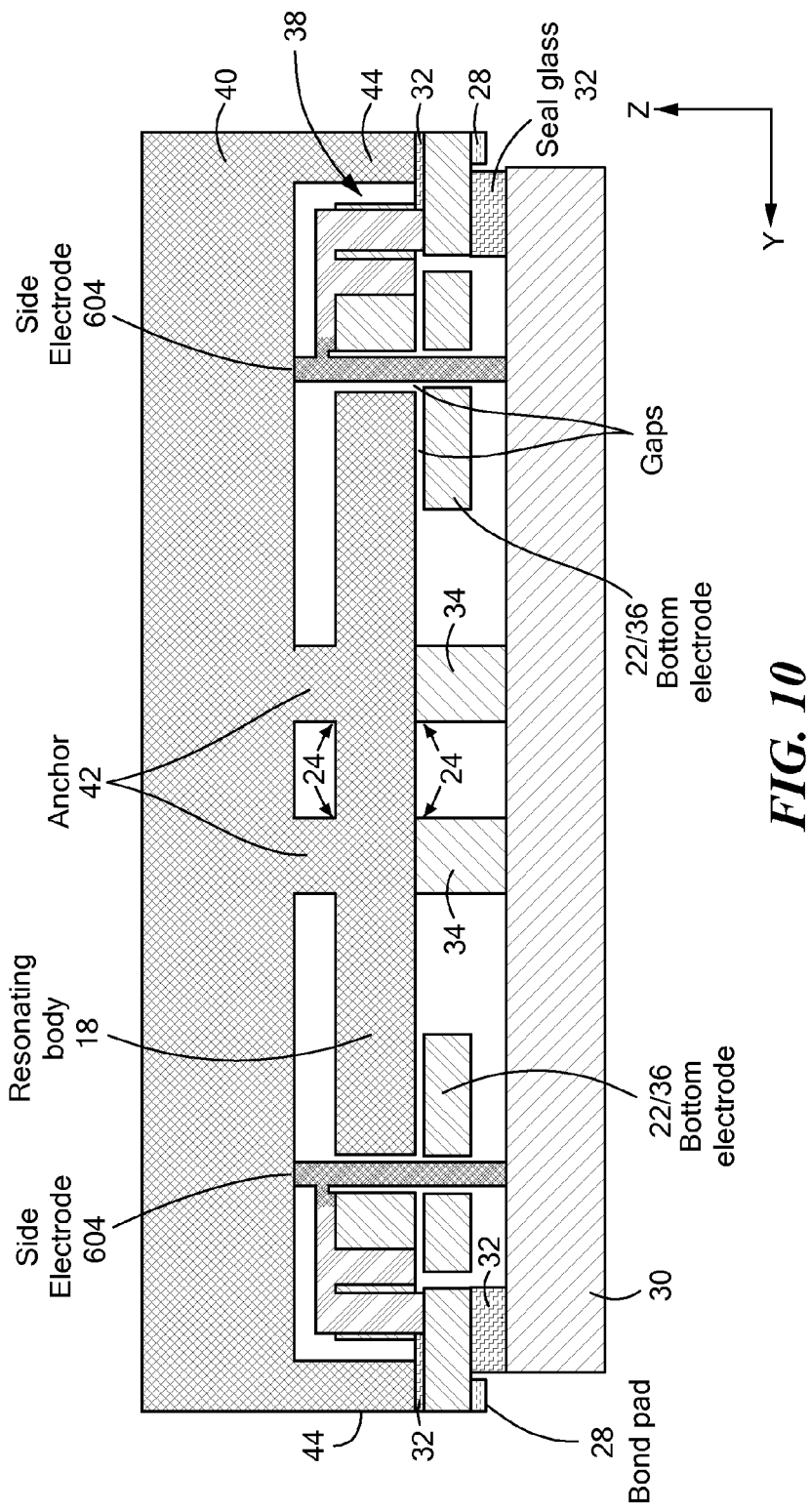
FIG. 10 schematically shows a cross-sectional view of the gyroscope of FIG. 9 along line 3-3 in accordance with a first embodiment.

FIG. 9 schematically shows a perspective view of a bulk acoustic wave gyroscope 12 configured in accordance with illustrative embodiments of the invention. The use of a bulk acoustic wave gyroscope for this illustrative embodiment is for convenience only with respect to electrode anchoring, and the present invention is not limited a bulk acoustic wave gyroscope or to specific concepts of operation described below for this illustrative embodiment, many of which are known generally in the art. This figure also has a partial cutaway view to show its vibrating proof mass 18, and an outline of a member stabilizing a portion of that proof mass 18 (shown in dashed lines). The proof mass may be any polygon shape, e.g., circular or rectangular, and for convenience, may be referred to herein merely as a "mass," "movable mass," "vibrating mass," "resonating body," or the like. To further illustrate this embodiment, FIG. 10 schematically shows a rotated, cross-sectional view of the bulk acoustic wave gyroscope of FIG. 9 along line 3-3.

Specifically, this description uses the terms "top," "bottom," and the like for descriptive purposes only. Those terms are used with respect to the frame of reference of FIG. 10. FIG. 9, however, is rotated 180 degrees (i.e., the top is down and the bottom is up) to better show the components. Accordingly, elements identified as "top" elements in FIG. 10, the correct orientation, are on the bottom side of FIG. 9. For example, FIG. 9 shows a top substrate 40 near the top of the structure, while FIG. 10 shows that same top substrate 40 near the bottom of the structure—because FIG. 10 is rotated 180 degrees from the frame of reference figure.

Although the gyroscope 12 may be any type of gyroscope, the gyroscope 12 as depicted is a two dimensional gyroscope that measures rotational movement about the X-axis and Y-axis shown in FIG. 9. Accordingly, those skilled in the art refer to this type of gyroscope as an X/Y gyroscope, or a two dimensional gyroscope. It nevertheless should be reiterated that illustrative embodiments apply to gyroscopes that measure rotation about its other axes, such as the Z-axis alone, about the X-axis and Z-axis, or about all three axes, among other things. Accordingly, discussion of this specific two-dimensional bulk acoustic wave gyroscope 12 should not limit various embodiments of the invention.

The bulk acoustic wave gyroscope 12 has a generally planar mass 18 (noted above) that resonates in a flexure mode upon receipt of an electrostatic actuation signal. In particular, during the flexure mode, a bottom electrode 22 (discussed below) produces an electrostatic force that causes portions of the mass 18 to vibrate in out of the plane modes of the mass 18. As a bulk acoustic wave gyroscope, however, the crystal lattice of the mass 18 itself vibrates in response to both a rotation and the continued actuation by the noted electrostatic signal. This is in contrast to other types of gyroscopes that have a shuttle/mass vibrating back and forth above a substrate during both actuation and detection phases. To that end, the embodiment shown in FIGS. 9 and 10 has the above noted bottom electrode 22 for actuating/vibrating the mass 18 in a flexure mode at a preselected frequency. As known by those skilled in the art, this frequency can be quite high, such as on the order of about 100 Kilohertz to 100 Megahertz. This bottom electrode 22 also could be used for sensing.

The mass 18 is configured to vibrate in a predetermined manner at the known vibration frequency. For example, the vibration frequency may be the resonant frequency of the mass 18 itself. As such, the mass 18 vibrates in and out of plane in a non-uniform manner. Specifically, parts of the mass 18 may vibrate, while other parts of the mass 18 may remain substantially stable; i.e., the stable portions will vibrate at approximately zero Hertz. In other words, the stable portions substantially do not vibrate at all. The stable portions are known as "nodes 24" and preferably are located generally symmetrically about the top and bottom faces of the mass 18. For example, when vibrating at the resonant frequency, the bottom face of a 200 micron radius mass 18 may have a node 24 that forms a general ellipse about the center of the mass 18. This elliptical node 24 may have a donut-shape, with a radius of between about ten and forty microns.

Rotation about the X-axis or Y-axis causes the shape of the mass 18 to change into a bulk mode or flexural mode shape, depending on the configuration of the gyroscope 12. For example, if a 2-axis gyroscope 12 (i.e., X-Y gyroscope) is driven in flexural out of plane mode, then the sense mode may be in-plane bulk mode. As another example, if the gyroscope 12 is driven in bulk mode, then the sense mode may be a flexural out-of plane mode.

To detect any of these changes in shape, the gyroscope 12 has a plurality of side electrodes 604 generally circumscribing the mass 18. For example, the cutaway of FIG. 9 shows four side electrodes 604 that can detect this change. More specifically, the side electrodes 604 form a variable capacitor with the side wall of the mass 18. A change in the shape of the mass 18, in the bulk mode, causes at least a portion of its side wall to change its position, thus changing the distance between it and the side electrode 604. This changes the variable capacitance measured by the side electrode 604. It is this capacitance change that provides the necessary movement information.

As known by those skilled in the art, the gyroscope 12 can operate in a flexural mode for actuation, and a bulk mode for sense. In yet other embodiments, the gyroscope can operate in a bulk mode for both actuation and sense.

A plurality of pads 28 formed on the same layer or different layer as the bottom electrode 22 electrically connect the bottom and top electrodes 22 and 604 to other circuitry. The bottom electrodes 22 can be independent of the top electrodes 604, or have some connection or relationship, depending on the application. Off-chip circuitry or on-chip circuitry (not shown) thus detects the noted capacitance change as a changing signal, which includes the necessary information for identifying the degree and type of rotation. The larger system then can take appropriate action, such as controlling the rotation of tires in an automobile for stabilization control, or changing the trajectory of a guided missile.

Naturally, the mass 18 (i.e., the primary member, which can take on other forms, such as a spoke or ring) should be supported to function most effectively. To that end, the gyroscope 12 has a bottom substrate 30 mechanically bonded to the bottom of the mass 18, and a top substrate 40 mechanically bonded to the top of the mass 18. These and other bonds can be conductive or non-conductive, depending on the anticipated application. In illustrative embodiments, the bottom substrate 30 is formed from a single crystal silicon wafer and hermetically bonded to the layer having the bottom electrode 22 and pads 28, which also is bonded to the top substrate 40. For example, a ring of seal glass 32, or glass frit or metal-metal bonding, can hermetically seal this bottom substrate 30 to the mass/electrode structure.

The bottom substrate 30 shown in FIGS. 9 and 10 also has a bottom support portion 34 that mechanically connects to the bottom face of the mass 18. In illustrative embodiments, the bottom support portion 34 is connected directly to the node 24 on the bottom face of the mass 18. As noted above, this node 24 substantially does not vibrate, or has a very small vibration, when the mass 18 as actuated at its resonant frequency. The bottom support portion 34 can be formed from any number of materials. For example, this structure can be a solid piece of polysilicon, or a part of the layer forming the bottom electrode 22 and seal glass 32. Alternatively, the bottom support can be formed from the same material as the bottom substrate 30—e.g., one or more pedestals formed from a timed etch of the bottom substrate 30. In that case, the bottom support is integral with the bottom substrate 30, and formed from the same material as the bottom substrate 30 (e.g., single crystal silicon).

The substrates 30 and 40 can be connected to the mass 18 by a conductive or non-conductive bond. Alternatively, they could be connected to the mass 18 by a method of deposition that can create top or bottom anchors, or both top and bottom anchors. The anchors can have conductors that electrically connect with any or all of the electrodes 22/604 and/or the mass 18. Moreover, in some embodiments, the bottom electrodes 22 are both mechanically and electrically isolated from the side electrodes 604.

Conventional micromachining processes may form the mass 18 and layer immediately beneath the mass 18 in any number of known ways. For example, that portion of the gyroscope 12 may be formed from a micromachined silicon-on-insulator wafer (also known as an "SOI" wafer). In that case, the mass 18 may be formed from the top, single crystal silicon layer of the SOI wafer. Moreover, the side electrodes 604 may be formed from deposited polysilicon and electrically connected with the bond pads 28, which may be formed from deposited metal.

As known by those skilled in the art, the top SOI layer is typically much thinner than the bottom layer 36 of the SOI wafer, which also is formed from single crystal silicon. The layer having the bottom electrode 22 (referred to as the "bottom layer 36"), however, is thinner than the layer having the mass 18 (referred to as the "top layer 38"). Although not necessary, illustrative embodiments thin this bottom layer 36 to reduce the profile of the overall sensor, and improve the performance of the bottom electrode 22. For example, the mass 18 may have a thickness of about 50 microns, while the bottom electrode 22 may have a thickness of about the same thickness of the mass or less, e.g., about 40 microns.

Figure 11:
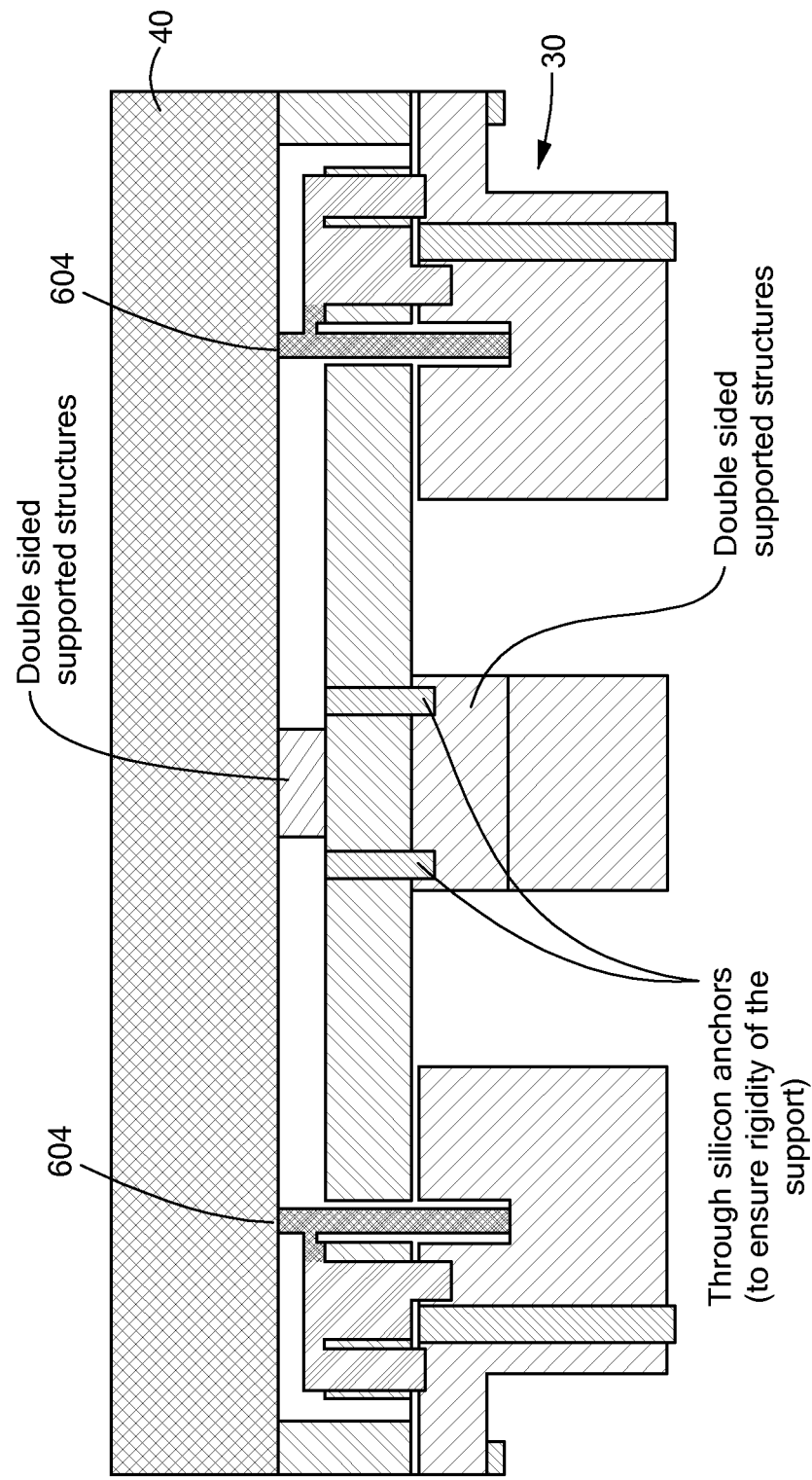
FIG. 11 schematically shows a cross-sectional view of the gyroscope of FIG. 9 along line 3-3 in accordance with another embodiment.

As FIGS. 10 and 11 show, preferred embodiments form an anchor that extends from the side electrode in the Z-direction. Specifically, the side electrodes 604 shown in FIGS. 10 and 11 have one or more anchors extending integrally from their bottom surfaces and onto or into the bottom substrate 30 or structures secured by the bottom substrate 30. The side electrodes 604 also have similar anchors extending from their top surfaces to the top substrate 40. In FIGS. 10 and 11, the portion of the electrode that is anchored to the top and bottom structures is highlighted. The top and bottom anchors are in addition to other anchors that can anchor from the side surface of the side electrodes 604. Thus, the side electrodes 604 can be anchored from its top, bottom, and side surfaces, or some subset of those sides—and can be generally polygon shaped, e.g., donut shaped or rectangular shaped or round. Despite all these anchors, the sides of the side electrodes 604 facing the mass 18 (the "transduction side") should have no anchors.

Illustrative embodiments form the electrodes 604, mass 18, and spaces between the mass 18 and electrodes 604, among other things, to be self-aligning. To that end, as known by those skilled in the art, those features are formed from the same mask during fabrication.

Figure 12A:
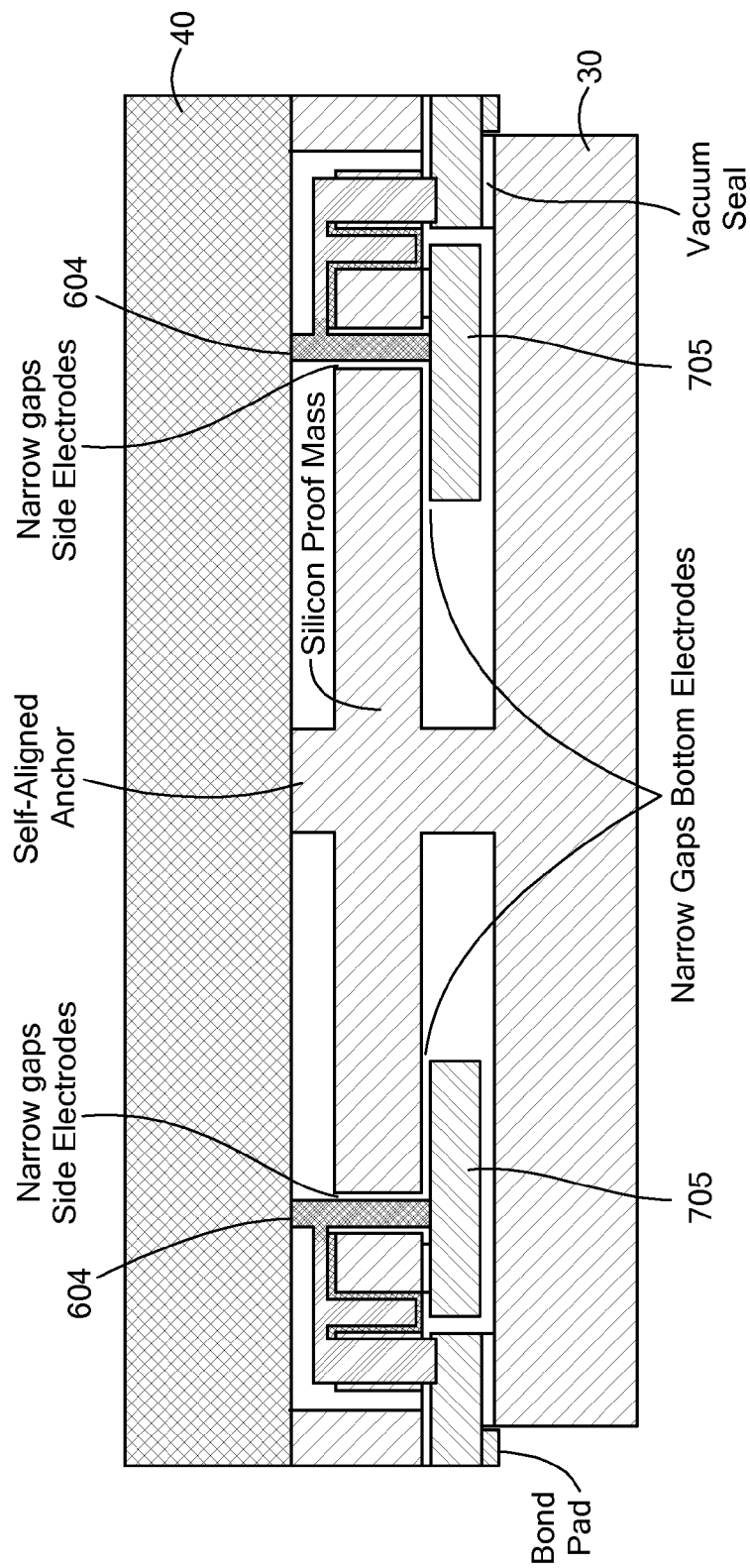
FIGS. 12A and 12B schematically show cross-sectional views of the gyroscope in accordance with other embodiments.
Figure 12B:
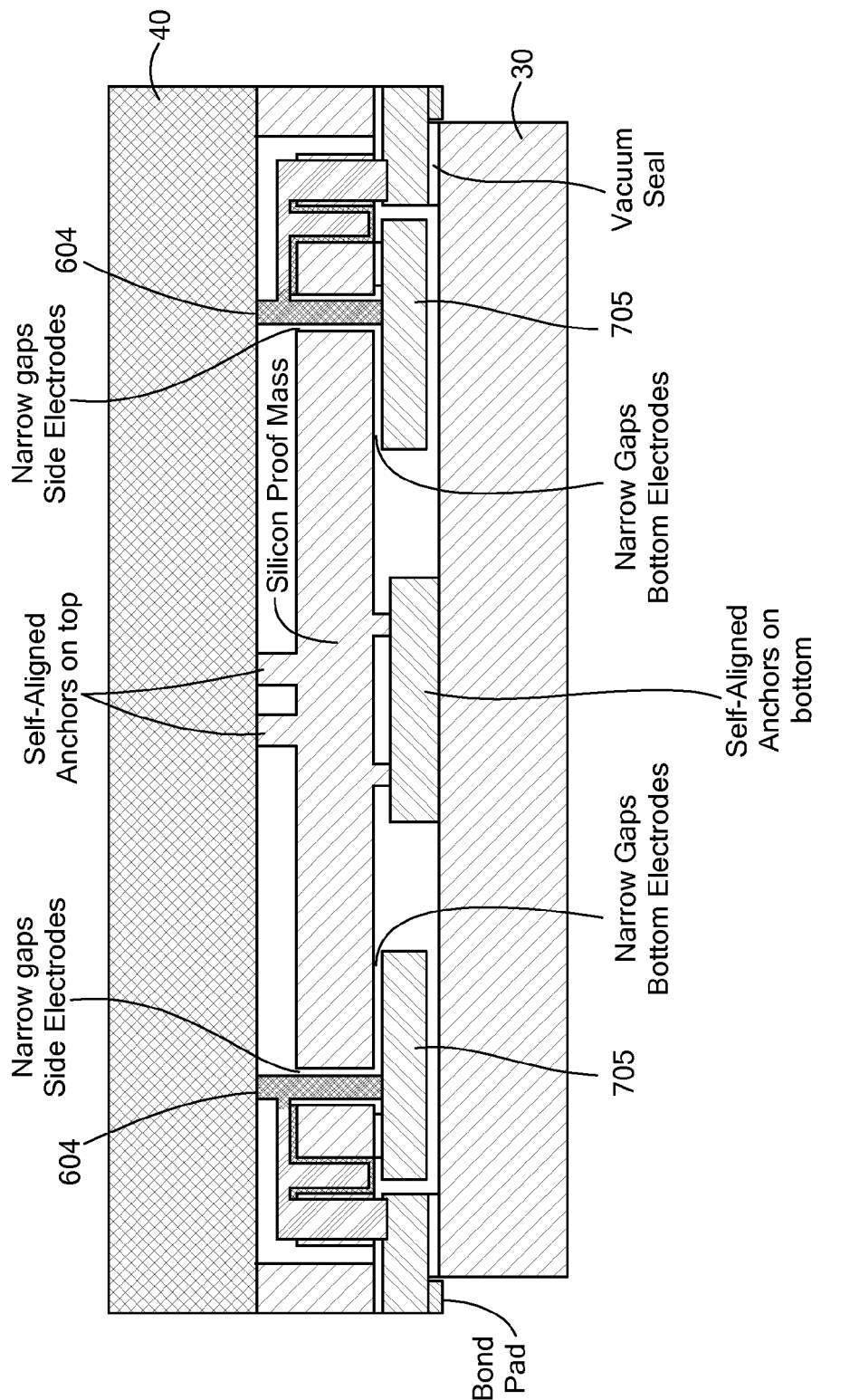

The mass 18 can be secured to the top or bottom substrate 40, 30 in any number of manners. For example, polysilicon anchors can extend from the bottom substrate 30 and through the mass 18 (e.g., see FIGS. 12A and 12B, which show two different types of proof mass anchoring). These anchors can extend all the way up to the top surface of the mass 18, or only partially through the profile of the mass 18. In a similar manner, the anchors can extend from the top substrate 40 and through the mass 18. These anchors, in either of the noted embodiments, can ensure rigidity of the support mechanism. They can be polygon shaped, e.g., donut shaped or rectangular shaped or round. FIGS. 12A and 12B also show the side electrodes 604 anchored to the top substrate 40 and to an intermediate support structure 705 that is below the plane of the proof mass and above the plane of the bottom substrate 30. One consequence of anchoring the electrode 604 to the intermediate support structure 705 rather than to the bottom substrate 30 is that the electrode 604 can be shortened and therefore will be stiffer and less prone to bending, thus further constraining the electrode.

Figure 13:
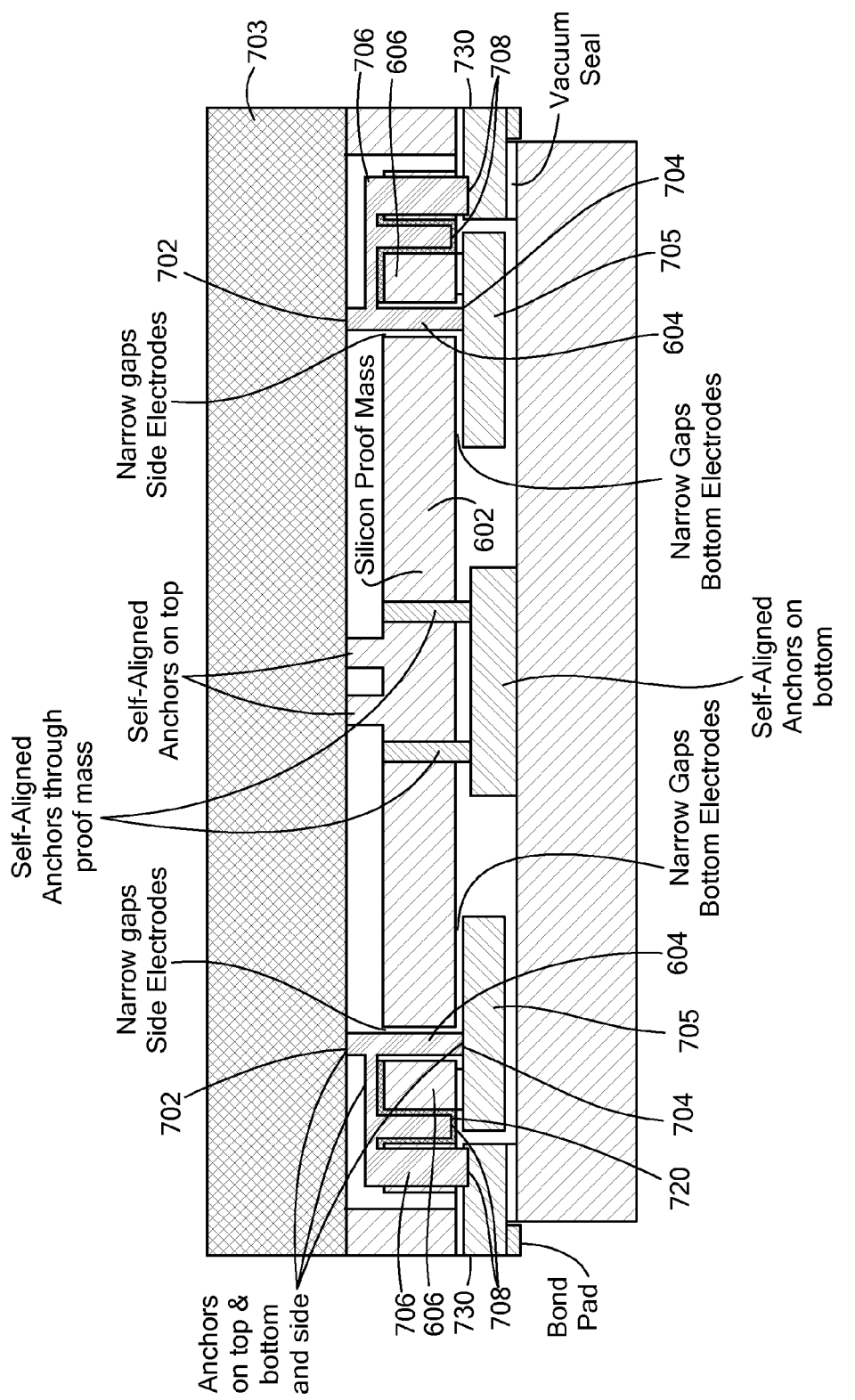
FIG. 13 shows the device of FIG. 12B in greater detail, with components labeled as in FIG. 7.

FIG. 13 shows the device of FIG. 12B in greater detail, with components labeled as in FIG. 7. Specifically, the top and bottom anchors 702 and 704 of each electrode 604 are coupled directly to the top and bottom supports 703 and 705, and an extended portion 706 provides additional side anchoring by virtue of being coupled to the structure 606 (which in this example is formed from the same material layer as the mass 602) and also including two through-silicon anchors 708 through the structure 606, one of which connects to a base structure 730 and may in electrical connectivity with a bond pad for providing electrical connection to the electrode 604. In this example, each electrode 604 is mechanically and/or electrically isolated from the structure 606 via a material 720.

It should be noted that principals of illustrative embodiments also apply to other devices. For example, they can apply to resonators, and resonator based sensors, such as biosensors, chemical sensors, etc.

It should be noted that, where reference is made to anchoring of a surface, the entire surface or just a portion of the surface may be anchored.

Accordingly, illustrative embodiments mitigate the impact of linear acceleration on a shell-type gyroscope (i.e., a gyroscope that operates in one or both the flexure mode and bulk mode) by implementing one or more of the following:
- mechanically constraining the mass 18 from both its top and bottom sides,
- mechanically anchoring the side electrodes 604 from their top and/or bottom surfaces,
- extending an anchor through the mass 18, and
- self-aligning the mass 18, electrodes, and the space between the mass and electrodes.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application.

Potential claims (prefaced with the letter "P" so as to avoid confusion with the actual claims presented below):

P1. A shell-type gyroscope comprising:
a primary member configured to resonate in a flexure mode or bulk mode in response to receipt of an electrostatic signal, the primary member having a bottom side, the primary member being configured to operate in a bulk mode or flexure mode when rotated;
a bottom substrate supporting the primary member;
a side electrode for electrostatically interacting with the primary member, at least a portion of the side electrode being in the same plane as the primary member, the side electrode having at least one surface that is generally parallel with the bottom side of the primary member; and
an anchor stabilizing the at least one surface of the side electrode.

P2. The gyroscope as defined by claim P1 wherein the anchor secures the at least one surface of the side electrode to the bottom substrate.

P3. The gyroscope as defined by claim P1 further comprising an anchor through the primary member.

P4. The gyroscope as defined by claim P3 wherein the anchor secures the primary member to the bottom substrate.

P5. The gyroscope as defined by claim P1 wherein the side electrode has a first side surface generally facing a side surface of the primary member, the side electrode having a second side surface that is generally opposite the first side surface, the second side surface being secured with a second anchor to a stationary portion.

P6. The gyroscope as defined by claim P5 wherein the first side surface is generally free of anchors.

P7. The gyroscope as defined by claim P1 further comprising a top substrate secured to the primary member, the anchor securing the at least one surface of the side electrode to the top substrate.

P8. The gyroscope as defined by claim P1 further comprising a bottom electrode between the primary member and the bottom substrate, the bottom electrode being for electrostatically interacting with the primary member.

P9. The gyroscope as defined by claim P1 wherein the primary member and side electrode are self-aligned.

P10. A shell-type gyroscope comprising:
a primary member configured to resonate in a flexure mode or bulk mode in response to receipt of an electrostatic signal, the primary member having a bottom side, the primary member being configured to operate in a bulk mode or flexure mode when rotated;

a substrate supporting the primary member; and
an anchor extending into the primary member and securing the primary member to the substrate.

P11. The gyroscope as defined by claim P10 wherein the substrate is one of a bottom and top substrate.

P12. The gyroscope as defined by claim P10 wherein the substrate comprises at least one of a bottom substrate and a top substrate.

P13. The gyroscope as defined by claim P12 wherein the primary member is secured by both the bottom and top substrate.

P14. The gyroscope as defined by claim P12 wherein the primary member is secured by both the bottom and top substrates and an anchor through primary member.

P15. The gyroscope as defined by claim P14 wherein the anchor comprises trenches filled with conductive material.

P16. The gyroscope as defined by claim P12 wherein the side electrodes are secured by both the bottom and top substrates.

P17. The gyroscope as defined by claim P12 wherein the primary member is secured by both the bottom and top substrates with an ultra-low gxg sensitivity.

P18. The gyroscope as defined by claim P17 wherein the gxg sensitivity is between about $10^{-2}$ to $10^{-5}$ deg/sec/g$^2$.

These potential claims are directed generally to a shell-type gyroscope (i.e., a gyroscope that operates in one or both of bulk and flexure modes) that has a primary member configured to resonate in a flexure mode or bulk mode in response to receipt of an electrostatic signal. The primary member has a bottom side and is configured to operate in a bulk mode when rotated. In addition, the gyroscope has a bottom substrate supporting the primary member, and a side electrode for electrostatically interacting with the primary member. At least a portion of the side electrode is in the same plane as the primary member and has at least one surface that is generally parallel with the bottom side of the primary member. An anchor stabilizes the at least one surface of the side electrode.

In accordance with one embodiment of such invention, a shell-type gyroscope (i.e., a gyroscope that operates in one or both of bulk and flexure modes) has a primary member configured to resonate in a flexure mode or bulk mode in response to receipt of an electrostatic signal. The primary member has a bottom side and is configured to operate in a bulk mode (or flexural mode) when rotated. In addition, the gyroscope has a bottom substrate supporting the primary member, and a side electrode for electrostatically interacting with the primary member. At least a portion of the side electrode is in the same plane as the primary member and has at least one surface that is generally parallel with the bottom side of the primary member. An anchor stabilizes the at least one surface of the side electrode.

For example, the anchor can secure the at least one surface of the side electrode to the bottom substrate (or a top substrate, if one is included). Moreover, the gyroscope also may have an anchor that extends through the primary member. Among other things, the anchor may secure the primary member to the bottom substrate.

The side electrode has a first side surface generally facing a side surface of the primary member, and a second side surface that is generally opposite the first side surface. In some embodiments, the second side surface is secured to a stationary portion of the substrate. The first side surface may be generally free of anchors. Various embodiments also have a top substrate secured to the primary member. Moreover, the gyroscope also may have a bottom electrode.

In accordance with another embodiment of such invention, a shell-type gyroscope has a primary member configured to resonate in a flexure mode or bulk mode in response to receipt of an electrostatic signal. The primary member has a bottom side and is configured to operate in a bulk mode or flexure mode when rotated. In addition, the gyroscope has a substrate supporting the primary member, and an anchor extending into the primary member (either completely through its profile or partly through its profile) and securing the primary member to the substrate.

The primary member may be secured by both the bottom and top substrates with to improve and achieve ultra-low gxg sensitivity as well as g sensitivity (e.g., linear acceleration in gyroscopes). For example, the gxg sensitivity may be between about $10^{-2}$ to $10^{-5}$ deg/sec/g$^2$. Some embodiments may have a range for linear acceleration sensitivity of between about $10^{-4}$ to $10^{-8}$ deg/sec/g.

It should be noted that, although specific features are shown in some drawings and not in others, this is for convenience only, as various features generally may be combined with any or all other features to produce various alternative embodiments of the invention.

Although the above discussion discloses various exemplary embodiments of the invention, it should be apparent that those skilled in the art can make various modifications that will achieve some of the advantages of the invention without departing from the true scope of the invention.

What is claimed is:

1. A MEMS device comprising:
a movable mass having a top surface, a bottom surface, and at least one side surface; and
at least one electrode configured to interact with the mass, wherein the at least one electrode is adjacent to a side surface of the mass, and wherein a top surface of the electrode is anchored to an overlying support structure and wherein a bottom surface of the electrode is anchored to an underlying support structure in order to constrain movement of the electrode, wherein the electrode is anchored to the overlying support structure via a plurality of top anchors and is anchored to the underlying support structure via a plurality of bottom anchors.

2. A MEMS device according to claim 1, wherein the at least one electrode is configured to interact with the mass electrostatically.

3. A MEMS device according to claim 1, wherein the electrode is anchored to the overlying support structure via a plurality of top anchors that protrude at least partially into the electrode and the overlying support structure and is anchored to the underlying support structure via a plurality of bottom anchors that protrude at least partially into the electrode and the underlying support structure.

4. A MEMS device according to claim 1, wherein the electrode is further anchored by at least one surface other than the top surface and the bottom surface to at least one side support structure.

5. A MEMS device according to claim 1, wherein the electrode is formed on an electrode support structure, and wherein the electrode includes at least one side anchor through at least a portion of the electrode support structure.

6. A MEMS device according to claim 5, wherein the electrode support structure and the mass are fabricated from a common layer of material or from a different layer of material.

7. A MEMS device according to claim 1, wherein the at least one electrode is configured for at least one of driving and sensing movement of the mass.

8. A MEMS device according to claim 1, wherein the overlying support structure is a device cap.

9. A MEMS device according to claim 1, wherein the underlying support structure is a device substrate.

10. A MEMS gyroscope comprising:
a resonant mass having a top surface, a bottom surface, and at least one side surface; and
at least one electrode configured to interact with the mass, wherein the at least one electrode is adjacent to a side surface of the mass, and wherein a top surface of the electrode is anchored to an overlying support structure and wherein a bottom surface of the electrode is anchored to an underlying support structure in order to constrain movement of the electrode, wherein the electrode is anchored to the overlying support structure via a plurality of top anchors and is anchored to the underlying support structure via a plurality of bottom anchors.

11. A MEMS gyroscope according to claim 10, wherein the at least one electrode is configured to interact with the mass electrostatically.

12. A MEMS gyroscope according to claim 10, wherein the electrode is anchored to the overlying support structure via a plurality of top anchors that protrude at least partially into the electrode and the overlying support structure and is anchored to the underlying support structure via a plurality of bottom anchors that protrude at least partially into the electrode and the underlying support structure.

13. A MEMS gyroscope according to claim 10, wherein the electrode is further anchored by at least one surface other than the top surface and the bottom surface to at least one side support structure.

14. A MEMS gyroscope according to claim 10, wherein the electrode is formed on an electrode support structure, and wherein the electrode includes at least one anchor through at least a portion of the electrode support structure.

15. A MEMS gyroscope according to claim 14, wherein the anchor through at least a portion of the electrode support structure is formed by trench refilling with a conductive or non-conductive material.

16. A MEMS gyroscope according to claim 14, wherein the electrode support structure and the mass are fabricated from a common layer of material or from a different layer of material.

17. A MEMS device according to claim 10, wherein the overlying support structure is a device cap.

18. A MEMS device according to claim 10, wherein the underlying support structure is a device substrate or a cap.

19. A MEMS gyroscope according to claim 10, wherein the gyroscope is a shell-type gyroscope in which the resonant mass is configured to resonate in a flexure mode or bulk mode in response to receipt of an electrostatic signal, and wherein the at least one electrode is configured for at least one of driving and sensing movement of the resonant mass.

20. A MEMS gyroscope according to claim 10, wherein the top surface of the resonant mass is anchored to an overlying support structure and wherein the bottom surface of the resonant mass is anchored to an underlying support structure in order to constrain movement of the resonant mass.

21. A MEMS gyroscope according to claim 10, wherein at least one of:
the top surface of the electrode and the top surface of the resonant mass are anchored to the same overlying support structure;
the top surface of the electrode and the top surface of the resonant mass are anchored to different overlying support structures;
the bottom surface of the electrode and the bottom surface of the resonant mass are anchored to the same underlying support structure; and
the bottom surface of the electrode and the bottom surface of the resonant mass are anchored to different underlying support structures.

22. A method for forming a MEMS device having a movable mass and at least one electrode configured to interact with the mass, the movable mass having a top surface, a bottom surface, and at least one side surface, wherein the at least one electrode is adjacent to a side surface of the mass, the method comprising:
anchoring a top surface of the electrode to an overlying support structure; and
anchoring a bottom surface of the electrode to an underlying support structure in order to constrain movement of the electrode, wherein the electrode is anchored to the overlying support structure via a plurality of top anchors and is anchored to the underlying support structure via a plurality of bottom anchors.

23. A method according to claim 22, further comprising:
anchoring the electrode by at least one surface other than the top surface and the bottom surface to at least one side support structure.

* * * * *